(12) United States Patent
Zhang et al.

(10) Patent No.: US 11,904,239 B2
(45) Date of Patent: Feb. 20, 2024

(54) VERIFICATION OF GAME SCORE

(71) Applicant: SHANGHAI HODE INFORMATION TECHNOLOGY CO., LTD., Shanghai (CN)

(72) Inventors: Yi Zhang, Shanghai (CN); Biao Yan, Shanghai (CN); Haofeng Li, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 5 days.

(21) Appl. No.: 17/390,548

(22) Filed: Jul. 30, 2021

(65) Prior Publication Data

US 2022/0032184 A1 Feb. 3, 2022

(30) Foreign Application Priority Data

Aug. 3, 2020 (CN) .......................... 202010765746.7

(51) Int. Cl.
*A63F 13/46* (2014.01)
*A63F 13/44* (2014.01)
*G06F 9/30* (2018.01)

(52) U.S. Cl.
CPC .............. *A63F 13/46* (2014.09); *A63F 13/44* (2014.09); *G06F 9/30025* (2013.01); *A63F 2300/61* (2013.01)

(58) Field of Classification Search
CPC ...... A63F 13/46; A63F 13/44; A63F 2300/61; A63F 13/35; A63F 13/86; A63F 13/75; A63F 13/798; G06F 9/30025
See application file for complete search history.

(56) References Cited

U.S. PATENT DOCUMENTS

| | | | | |
|---|---|---|---|---|
| 2,274,342 | A * | 2/1942 | Ormsby | A63F 9/18 273/459 |
| 7,890,558 | B2 * | 2/2011 | Esbensen | H03M 7/06 708/204 |
| 8,700,744 | B2 * | 4/2014 | Anderson | H04L 69/22 709/227 |
| 8,715,072 | B2 * | 5/2014 | Harris | A63F 13/30 463/43 |
| 9,870,713 | B1 * | 1/2018 | Ducrou | G09B 7/07 |
| 11,399,284 | B1 * | 7/2022 | Haleem | H04W 16/18 |
| 2009/0070479 | A1 * | 3/2009 | Anderson | H04L 69/22 709/230 |

(Continued)

*Primary Examiner* — Seng H Lim
(74) *Attorney, Agent, or Firm* — Fisher Broyles, LLP (57) ABSTRACT

A computer-implemented method is provided, the method including: a client calculating a game score in real time according to an operation of a user, recording the operation and an operation time corresponding to the operation for generation of an operation sequence, and reporting the operation sequence and a score calculation result to a server after a game is over; the server starting a game loop, and performing the operation during the game loop according to the operation sequence, so as to calculate a real score of the user; comparing the real score with the score calculation result to verify whether the user cheats, and feeding back a verification result to the client; and the client receiving the verification result and performing a processing corresponding to the verification result.

20 Claims, 7 Drawing Sheets

(56) References Cited

U.S. PATENT DOCUMENTS

| | | | |
|---|---|---|---|
| 2011/0269547 A1* | 11/2011 | Harris | A63F 13/12 |
| | | | 463/42 |
| 2016/0023112 A1* | 1/2016 | Oniscu | A63F 13/80 |
| | | | 463/31 |
| 2016/0092168 A1* | 3/2016 | Lutz | H03M 7/24 |
| | | | 708/204 |
| 2020/0076529 A1* | 3/2020 | Li | H04L 1/0007 |
| 2021/0064338 A1* | 3/2021 | Emmart | G06F 7/483 |
| 2022/0193548 A1* | 6/2022 | Badichi | G06Q 30/02 |
| 2022/0387897 A1* | 12/2022 | Gunn | G07F 17/3295 |

\* cited by examiner

| | |
|---|---|
| 4 BYTES | A FIRST NUMBER OF BITS (N BITS) OCCUPIED BY OPERATION TIMES |
| 4 BYTES | A SECOND NUMBER OF BITS (M BITS) OCCUPIED BY USER OPERATIONS |
| N BIT | OPERATION TIME OF OPERATION 1 |
| M BIT | OPERATION 1 |
| N BIT | OPERATION TIME OF OPERATION 2 |
| M BIT | OPERATION 2 |
| N BIT | OPERATION TIME OF OPERATION 3 |
| M BIT | OPERATION 3 |
| ⋮ | ⋮ |

VERIFICATION OF GAME SCORE

CROSS-REFERENCE TO RELATED APPLICATIONS

The present application claims priority to Chinese patent application No. 202010765746.7, filed on Aug. 3, 2020, the entire contents of which are hereby incorporated by reference in their entirety for all purposes.

TECHNICAL FIELD

The present application relates to data processing, and particularly to verification of game score.

BACKGROUND

Action games are a type of games that are popular with many users, and always enjoys a good market. For this type of games, a physical engine is often used to simulate the experience in the real world, and players obtain good scores in the game through their own operations, so as to be on a ranking list or obtain corresponding achievement rewards.

It should be noted that the above content is not used to limit the scope of protection of the present application.

SUMMARY

One aspect of the present application provides a computer-implemented method, the method including: calculating a game score in real time according to an operation of a user; recording the operation and an operation time corresponding to the operation for generation of an operation sequence, wherein the operation sequence includes a plurality of operations and a plurality of operation times each corresponding to each of the operations; reporting the operation sequence and a score calculation result to a server after a game is over; and receiving a verification result of the game score from the server and performing a processing corresponding to the verification result, wherein the server performs the operation of the user according to the operation sequence to obtain a real score of the user, and compares the real score with the score calculation result to verify whether cheating occurs to the score calculation result.

Another aspect of the present application provides an electronic apparatus, the electronic apparatus including: one or more processors; and a memory storing one or more programs configured to be executed by the one or more processors, the one or more programs comprising instructions for: calculating a game score in real time according to an operation of a user; recording the operation and an operation time corresponding to the operation for generation of an operation sequence, wherein the operation sequence comprises a plurality of operations and a plurality of operation times each corresponding to each of the operations; reporting the operation sequence and a score calculation result to a server after a game is over; and receiving a verification result of the game score from the server and performing a processing corresponding to the verification, wherein the server performs the operation of the user according to the operation sequence to obtain a real score of the user, and compares the real score with the score calculation result to verify whether cheating occurs to the score calculation result.

Another aspect of the present application provides a non-transitory computer-readable storage medium. The storage medium stores one or more programs comprising instructions that, when executed by one or more processors of an electronic apparatus, cause the electronic apparatus to perform operations comprising: calculating a game score in real time according to an operation of a user; recording the operation and an operation time corresponding to the operation for generation of an operation sequence, wherein the operation sequence comprises a plurality of operations and a plurality of operation times each corresponding to each of the operations; reporting the operation sequence and a score calculation result to a server after a game is over; and receiving a verification result of the game score from the server and performing a processing corresponding to the verification result, wherein the server performs the operation of the user according to the operation sequence to obtain a real score of the user, and compares the real score with the score calculation result to verify whether cheating occurs to the score calculation result.

DETAILED DESCRIPTION

In order to make the embodiments and advantages of the present application clearer, the present application will be further described in detail below in conjunction with the accompanying drawings and embodiments. It should be understood that the specific embodiments described here are merely intended to explain the present application, but are not intended to limit the present application. All other embodiments obtained by those of ordinary skill in the art based on the embodiments of the present application without creative efforts shall fall within the scope of protection of the present application.

It should be noted that the descriptions related to "first", "second", etc. in the embodiments of the present application are merely used for the illustrative purpose, and should not be construed as indicating or implying the relative importance thereof or implicitly indicating the number of technical features indicated. Thus, features defined with "first" and "second" may explicitly or implicitly comprise at least one of the features. Additionally, technical solutions among various embodiments can be combined with each other, but they must be based on the realization by those of ordinary skill in the art. When a combination of technical solutions is contradictory or cannot be realized, it should be considered that such a combination of the technical solutions does not exist, and also does not fall within the scope of protection of the present application claimed.

Inventors found that in the related art, an immediate response is required to be made to the operations of the players in action games, and a score calculation process is often performed at a client, which makes it impossible to avoid the situation where some players tamper with scores at a local client and then report them to a server, so as to fraudulently obtain corresponding rewards or be on a ranking list. This situation will have a great negative impact on the entire game and destroy the healthy environment of the game, and consequently, a good game often loses popularity due to this kind of cheating. Therefore, for this type of games, there is a need for a means to prevent players from cheating, so as to verify whether players cheat on important scores.

In view of this, the present application provides a method of verifying a game score, an electronic apparatus, and a computer-readable storage medium.

Figure 1:
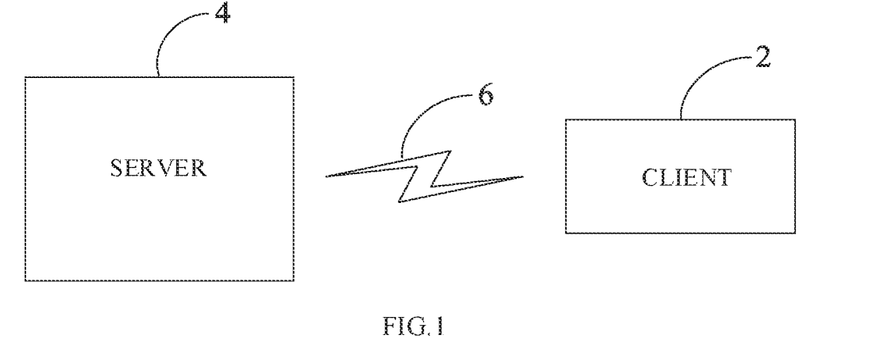
FIG. 1 is an architecture diagram of an application environment for implementing various embodiments of the present application.

Referring to FIG. 1, FIG. 1 is an architecture diagram of an application environment for implementing various embodiments of the present application. The present application may be applied to an application environment including, but not limited to, a client 2, a server 4, and a network 6.

The client 2 is configured to display a game interface to a user (a game player), receive operations of the user on the game, calculate a game score according to the operations, record an operation sequence of the user and a corresponding game time, and then report the operation sequence and a score calculation result to the server 4. The client 2 may be a terminal device such as a personal computer (PC), a mobile phone, a tablet computer, a portable computer, and a wearable device.

The server 4 is configured to provide data and technical support for the game in the client 2, and is further configured to receive the operation sequence and the score calculation result, and calculate a real score of the user according to the operation sequence, so as to verify whether cheating occurs. The server 4 may be a computing device such as a rack server, a blade server, a tower server, or a cabinet server, may be an independent server, or may be a server cluster composed of a plurality of servers.

The network 6 may be a wireless or wired network such as Intranet, Internet, a global system of mobile communication (GSM), wideband code division multiple access (WCDMA), a 4G network, a 5G network, Bluetooth, or Wi-Fi. The server 4 is communicatively connected to one or more clients 2 via the network 6 for data transmission and interaction.

Figure 2:
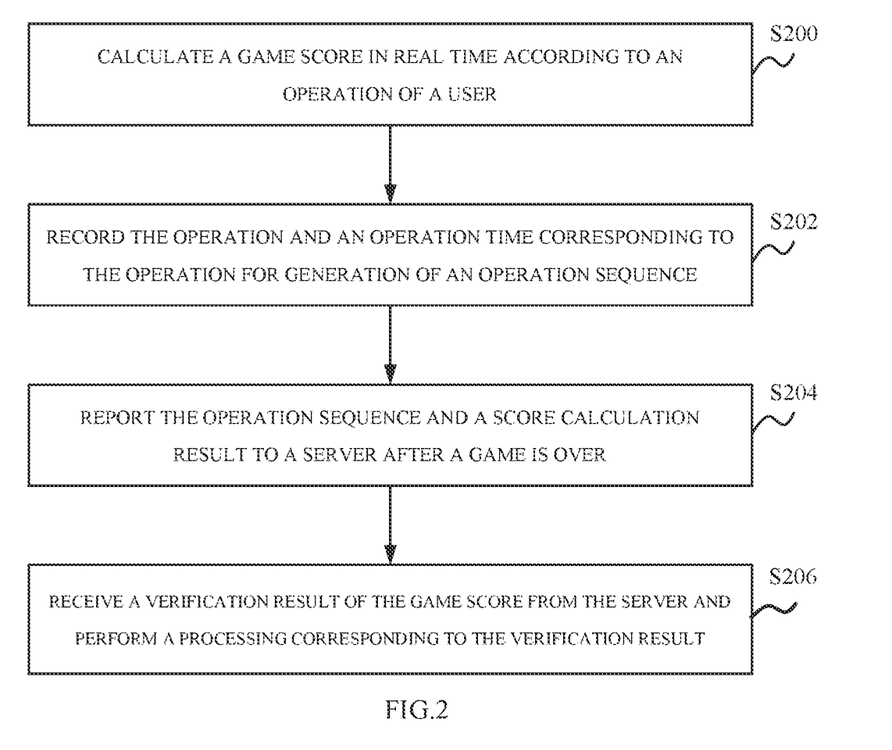
FIG. 2 is a flow chart of a method of verifying a game score according to some embodiments of the present application.

FIG. 2 is a flow chart of a method of verifying a game score according to some embodiments of the present application. It can be understood that the flow chart is not used to limit the order of execution of the steps. An example description is made by taking the client 2 as an execution subject.

The method comprises the following steps.

In S200, a game score is calculated in real time according to an operation of a user.

In a game application, especially an action game, it is needed to calculate a game score in real time according to an operation of a user. If the user obtains a good score in the game through his/her own operations, he/she can be on a ranking list or obtain a corresponding achievement reward. Because an immediate response is required to be made to the operations of the user in this type of games, a score calculation process is generally completed in the client 2, in which the game score of the user is calculated in real time according to the operations.

According to some embodiments, the score calculation result in the client 2 needs to be reported to the server 4 after a game is over, so that the server 4 verifies whether cheating occurs to the score.

It should be noted that cross-platform computations usually have the problem in floating-point precision because of different language compilers, different registers used, different rounding methods during computations, etc., which will result in different results for the same floating-point computation under different platforms. For example, in floating-point number representations of different devices, the value of 0.3 may be represented as 0.2999999999999 at the client 2, while represented as 0.3000000000000 at a verification side (server 4). The inconsistency of the floating-point number representations at both sides may cause even simple calculations to produce different results, and consequently, verification cannot be performed correctly. When the client 2 is a mobile phone, it is more prone to the precision problem compared with a PC due to huge differences in iOS and Android device system hardware on the mobile phone.

In order to ensure that the verification side and the client 2 at different platforms have consistent calculation results for the same floating-point computation, so as to avoid the precision problem, all floating-point computations are completed by means of indirect integer calculations according to some embodiments. This calculation is applicable to various platforms, and is used in computations with floating-point numbers, mainly including physical calculations, collision detection, health point modification calculations, etc.

Specifically, all numeric types used in game calculations, including an integer type and a floating-point type, are uniformly represented by bytes with a preset number of bits (e.g., 64 bits), and bytes with a second half number of bits therein (e.g., 32 bits in a second half segment) are used to store data after the decimal point, while excessive precision is discarded (data beyond 32 bits after the decimal point is discarded). In a binary number system in computers, "bit" abbreviated as b is the smallest unit of data storage, and each 0 or 1 is a bit. That is, both integer values and floating-point values are represented as integer data with 64 bits. According to some embodiments, the specific implementation of the above-mentioned integer calculation involves: multiplying integer or floating-point values by a preset multiple (e.g., 1000000000) for simultaneous conversion to integer data in the same format for being both applicable to integer calculations in all subsequent calculations, so that the problem of inconsistency in floating-point number calculations under different CPU architectures can be avoided by means of the integer calculation; and obtaining original values by dividing by the preset multiple (1000000000) in a display stage.

In S202, the operation and an operation time corresponding to the operation are recorded for generation of an operation sequence.

For each received operation of the user in the game, the client 2 records both the operation and the corresponding operation time. For example, in a fighting game, operations input by a user generally comprise operations on "up, down, left, and right" joysticks and four hitting buttons, and thus the above eight operations can be respectively recorded using eight values. In addition, it is also needed to record the time when each operation input by the user is received, and the time refers to a game time, i.e., the number of milliseconds taken from the start of the game to the current time upon receipt of the operation. According to a series of operations input by the user in the game and the operation time corresponding to each of the operations, an operation sequence can be generated.

In S204, the recorded operation sequence and a score calculation result are reported to a server after a game is over.

During the game, the client 2 calculates the game score in real time and records the operation sequence of the user. After the game is over, the client 2 reports the operation sequence and the score calculation result to the server 4, so that the server 4 verifies whether cheating occurs to the score.

Figure 3:
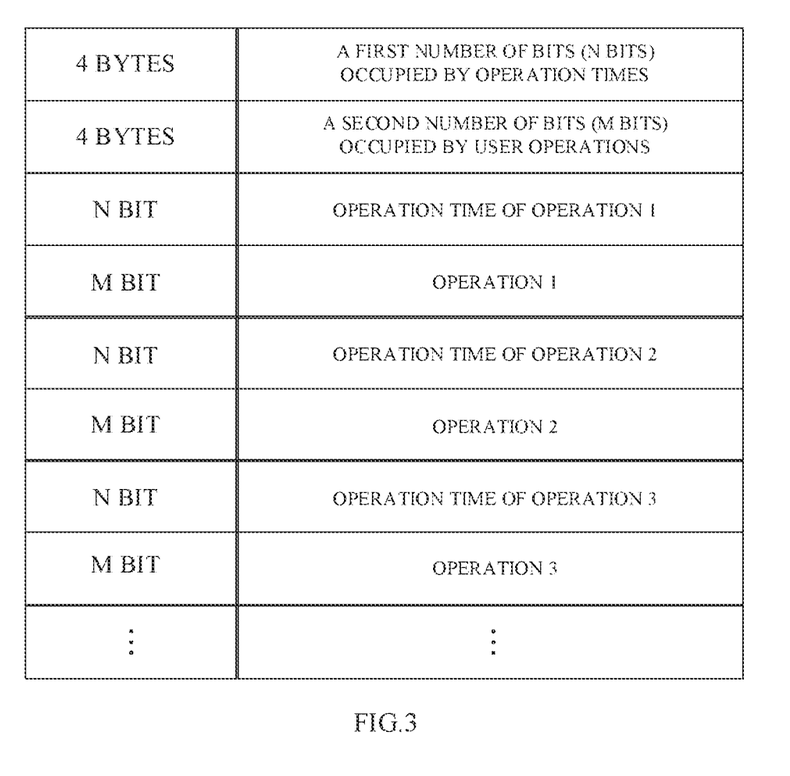
FIG. 3 is a schematic diagram of an example transmission protocol format in which a client reports an operation sequence to a server in the present application.

With reference to FIG. 3, it is a schematic diagram of a transmission protocol format in which the client 2 reports the operation sequence to the server 4. First, at the beginning of the protocol, a first preset number of bytes (e.g., 4 bytes) are used to represent a first number of bits (N bits) occupied by the operation time (game time in the number of milliseconds) in the protocol, that is to say, the value of N is defined in the 4 bytes. Additionally, a second preset number of bytes (the first preset number and the second preset number may be the same or different. According to some embodiments, the second preset number is the same as the first preset number in terms of the number of bits used, such as the next 4 bytes) are used to represent a second number of bits (M bits) occupied by the operation (the value corresponding to the user operation) in the protocol, that is to say, the value of M is defined in the 4 bytes. According to some embodiments, the first number of bits and/or the second number of bits, i.e., the values of N and/or M, may be determined according to one or more features specific to the game. For example, the features specific to the game comprise the number of optional operations (which may be used to determine the second number of bits, i.e., the value of M), the longest game duration (which may be used to determine the first number of bits, i.e., the value of N), etc. Because the values of N and M can be customized, the values of N and M can be reduced as much as possible according to different features specific to the game, so as to reduce the traffic during the reporting of a specific game using the protocol. For example, because N is the number of bits occupied by the operation time, which indicates the maximum possible operation time (the longest game duration), and a fighting game will not generally last more than one hour, N may be defined as 22. In addition, the operations input by a user in a fighting game generally comprise eight operations (the number of optional operations) on "up, down, left, and right" joysticks and four hitting buttons, and therefore, M may be defined as 10.

Then, in the protocol, each of the operations and the corresponding operation time in the operation sequence are respectively represented by the bytes with the first number of bits (N bits) and the bytes with the second number of bits (M bits). For example, in FIG. 3, after the first 8 bytes of the protocol, separately, an operation time of operation 1 is represented by N bits and operation 1 is represented by M bits, and then an operation time of operation 2 is represented by N bits and operation 2 is represented by M bits, and so on.

For conventional protocols, a fixed byte length is used to represent an operation time and the corresponding operation for any game. For such common fixed-length protocols, a byte space may be wasted. For example, it usually takes about 5 minutes to finish a fighting game, while it may take about 30 minutes to finish some racing games. If a fixed byte length is used in both games to define the game time, but the game that takes a shorter time actually does not need such a long byte, this will cause the protocol to use more bandwidth in transmission, thereby resulting in a waste of traffic.

According to some embodiments, the user operations are represented by bytes in an adaptive way, and the size of bytes used in the transmission of the operation sequence is reduced by means of a dynamic protocol length, such that the use of unnecessary bytes can be saved on. Moreover, such a transmission protocol greatly reduces the transmission bandwidth compared with a conventional transmission protocol of returning the state of every process of the whole game to a server.

By means of this transmission protocol, the client reports a series of operations to the verification side (server 4), and the verification side can restore the whole game process by 100% by means of the above-mentioned integer calculation, so as to obtain the real score of the user and verify the game score.

Specifically, after receiving the operation sequence and the score calculation result, the server 4 starts a game loop, and performs the operation of a user during the game loop according to the operation sequence, so as to obtain a real score of the user. The real score is compared with the score calculation result reported by the client 2 to verify whether cheating occurs to the score of the user, so as to determine a corresponding processing. If the score calculation result reported by the client 2 is consistent with the real score calculated by the server 2, it indicates that the user does not cheat and the game score verification is passed. If the score calculation result reported by the client 2 is inconsistent with the real score calculated by the server 2, it indicates that the user may cheat and the game score verification fails. In the process of performing operations of a user according to the operation sequence and calculating a real score, the server 4 also employs the above-mentioned integer calculation, i.e., using 64 bits to define numeric types used in the game calculations, and using 32 bits therein to store data after the decimal point.

Because the above-mentioned integer calculation is used in both the client 2 and the server 4, it can be ensured that calculation results for the same floating-point computation at both sides are consistent, and misjudgment of the verification result caused by the precision problem is avoided.

In S206, a verification result of the game score from the server is received and a processing corresponding to the verification result is performed.

The server 4 feeds back the verification result of the game score of the user to the client 2, and the client 2 receives the verification result. When the verification is passed, processing such as giving a reward to the user can be performed. When the verification fails, processing such as giving a warning against cheating to the user can be performed.

It should be noted that according to some embodiments, the server 4 may only verify the game score, and the client 2 determines a corresponding processing according to the verification result; or the server 4 may verify the game score and determine a corresponding processing, and then feed back both the verification result and the processing to the client 2, so that the client 2 directly performs processing according to the processing.

In the method of verifying a game score according to the above embodiments, it is possible to obtain a real score of a user by reporting an operation sequence of the user to the server and playing back the operation sequence in the server for comparison with and verification of the game score reported by the client, instead of merely receiving the report from the client, so as to achieve the purpose of preventing the user from cheating. Especially for some important scores, whether users cheat can be effectively verified, and negative impacts caused by misjudgment are avoided to maintain a healthy environment of games. Additionally, the above embodiments can also solve the problem of inconsistent calculation results of floating-point numbers under a multi-CPU architecture, and reduce, by means of a dynamic protocol length, the size of bytes used for the user operation sequence during transmission, thereby avoiding the waste of traffic.

Figure 4:
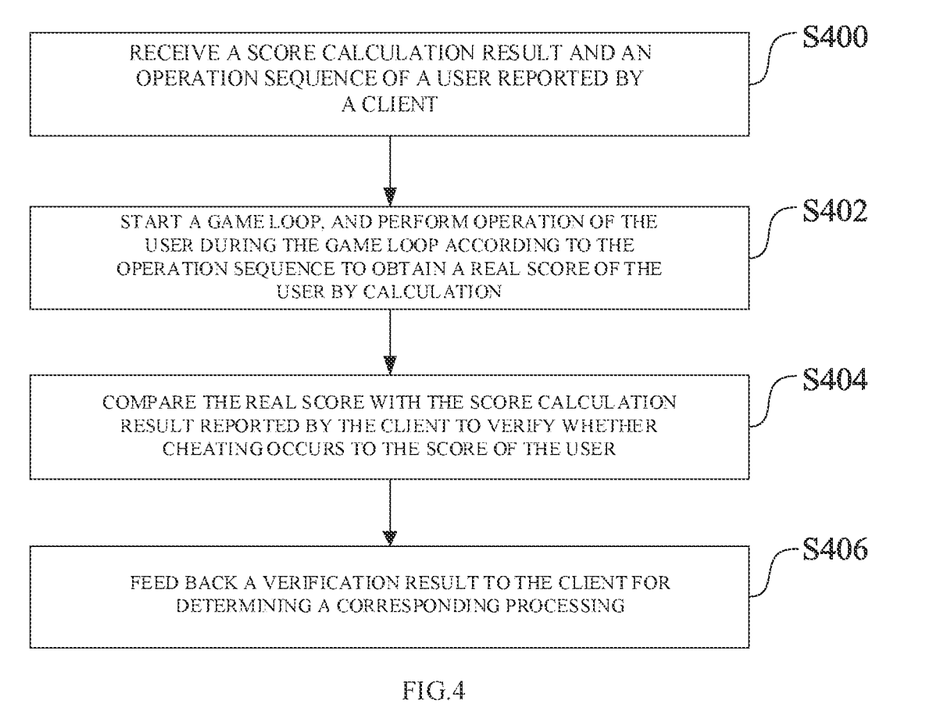
FIG. 4 is a flow chart of a method of verifying a game score according to some embodiments of the present application.

FIG. 4 is a flow chart of a method of verifying a game score according to some embodiments of the present application. It can be understood that the flow chart is not used to limit the order of execution of the steps. An example description is made by taking the server 4 as an execution subject.

The method comprises the following steps.

In S400, a score calculation result and an operation sequence of a user reported by a client are received.

In a game application, especially an action game, it is needed to calculate a game score in real time according to operations of a user. If the user obtains a good score in the game through his/her own operations, he/she can be on a ranking list or obtain a corresponding achievement reward. Because an immediate response is required to be made to the operations of the user in this type of games, a score calculation process is generally completed in the client 2, in which the game score of the user is calculated in real time according to the operations.

According to some embodiments, the score calculation result in the client 2 needs to be reported to the server 4 after a game is over, so that the server 4 verifies whether cheating occurs to the score.

It should be noted that cross-platform computations usually have the problem in float precision because of different language compilers, different registers used, different rounding methods in the calculation process, etc., which will result in different results for the same floating-point computation under different platforms. For example, in floating-point number representations of different devices, the value of 0.3 may be represented as 0.2999999999999 at the client 2, while represented as 0.3000000000000 at a verification side (server 4). The inconsistency of the floating-point number representations at both sides may cause even simple calculations to produce different results, and consequently, verification cannot be performed correctly. When the client 2 is a mobile phone, it is more prone to the precision problem compared with a PC due to huge differences in iOS and Android device system hardware on the mobile phone.

In order to ensure that the verification side and the client 2 at different platforms have consistent calculation results for the same floating-point computation, so as to avoid the precision problem, all floating-point computations are completed by means of indirect integer calculations according to some embodiments. This calculation is applicable to various platforms, and is used in computations with floating-point numbers, mainly including physical calculations, collision detection, health point modification calculations, etc.

Specifically, numeric types used in game calculations, including an integer type and a float type, are uniformly represented by bytes with a preset number of bits (e.g., 64 bits), and bytes with a second half number of bits therein (e.g., 32 bits in a second half segment) are used to store data after the decimal point, while excessive precision is discarded (data beyond 32 bits after the decimal point is discarded). In a binary number system in computers, "bit" abbreviated as b is the smallest unit of data storage, and each 0 or 1 is a bit. That is, both integer values and floating-point values are represented as integer data with 64 bits. According to some embodiments, the specific implementation of the above-mentioned integer calculation involves: multiplying integer or floating-point values by a preset multiple (e.g., 1000000000) for simultaneous conversion to integer data in the same format for being both applicable to integer calculations in all subsequent calculations, so that the problem of inconsistency in floating-point number calculations under different CPU architectures can be avoided by means of the integer calculation; and obtaining original values by dividing by the preset multiple (1000000000) in a display stage.

Moreover, for each received operation of the user in the game, the client 2 records both the operation and the operation time corresponding to the operation. For example, in a fighting game, operations input by a user generally comprise operations on "up, down, left, and right" joysticks and four hitting buttons, and thus the above eight operations can be respectively recorded using eight values. In addition, it is also needed to record the time when each operation input by the user is received, and the time refers to a game time, i.e., the number of milliseconds taken from the start of the game to the current time upon receipt of the operation. According to a series of operations input by the user in the game and the operation time corresponding to each of the operations, an operation sequence can be generated.

During the game, the client 2 calculates the game score in real time and records the operation sequence of the user. After the game is over, the client 2 reports the operation sequence and the score calculation result to the server 4, so that the server 4 verifies whether cheating occurs to the score.

In a transmission protocol for reporting the operation sequence, first, at the beginning of the protocol, a first preset number of bytes (e.g., 4 bytes) are used to represent a first number of bits (N bits) occupied by the operation time (game time in the number of milliseconds) in the protocol, that is to say, the value of N is defined in the 4 bytes. Additionally, a second preset number of bytes (the next 4 bytes) are used to represent a second number of bits (M bits) occupied by the operation (the value corresponding to the user operation) in the protocol, that is to say, the value of M is defined in the 4 bytes. According to some embodiments, the first number of bits and/or the second number of bits, i.e., the values of N and/or M, may be determined according to one or more features specific to the game. For example, the features specific to the game comprise the number of optional operations (which may be used to determine the second number of bits, i.e., the value of M), the longest game duration (which may be used to determine the first number of bits, i.e., the value of N), etc. Because the values of N and M can be customized, the values of N and M can be reduced as much as possible according to different features specific to the game, so as to reduce the traffic during the reporting of a specific game using the protocol. For example, because N is the number of bits occupied by the operation time, which indicates the maximum possible operation time (the longest game duration), and a fighting game will not generally last more than one hour, N may be defined as 22. In addition, the operations input by a user in a fighting game generally comprise eight operations (the number of optional operations) on "up, down, left, and right" joysticks and four hitting buttons, and therefore, M may be defined as 10. Then, in the protocol, each of the operations and the corresponding operation time in the operation sequence are respectively represented by the bytes with the first number of bits (N bits) and the bytes with the second number of bits (M bits).

For conventional protocols, a fixed byte length is used to represent an operation time and the corresponding operation for any game. For such common fixed-length protocols, a byte space may be wasted. For example, it usually takes about 5 minutes to finish a fighting game, while it may take about 30 minutes to finish some racing games. If a fixed byte length is used in both games to define the game time, but the game that takes a shorter time actually does not need such a long byte, this will cause the protocol to use more bandwidth in transmission, thereby resulting in a waste of traffic.

According to the above embodiments, the user operations are represented by bytes in an adaptive way, and the size of bytes used in the transmission of the operation sequence is reduced by means of a dynamic protocol length, such that the use of unnecessary bytes can be saved on. Moreover, such a transmission protocol greatly reduces the transmission bandwidth compared with a conventional transmission protocol of returning the state of every process of the whole game to a server.

By means of this transmission protocol, the client reports a series of operations to the verification side (server 4), and the verification side can restore the whole game process by 100% by means of the above-mentioned integer calculation, so as to obtain the real score of the user and verify the game score.

In S402, a game loop is started, and operation of a user are performed during the game loop according to the operation sequence to obtain a real score of the user by calculation.

According to each operation and the corresponding operation time in the operation sequence, the server 4 plays back the operations of the user once again, i.e., performing each corresponding operation according to each operation time recorded in the operation sequence during the game loop, and then, the real score of the user can be calculated. In the process of performing operations of a user according to the operation sequence and calculating a real score, the server 4 also employs the above-mentioned integer calculation, i.e., using 64 bits to define numeric types used in the game calculations, and using 32 bits therein to store data after the decimal point.

In S404, the real score is compared with the score calculation result reported by the client to verify whether cheating occurs to the score of the user.

If the score calculation result reported by the client 2 is consistent with the real score calculated by the server 2, it indicates that the user does not cheat and the game score verification is passed. If the score calculation result reported by the client 2 is inconsistent with the real score calculated by the server 2, it indicates that the user may cheat and the game score verification fails. Because the above-mentioned integer calculation is used in both the client 2 and the server 4, it can be ensured that calculation results for the same floating-point computation at both sides are consistent, and misjudgment of the verification result caused by the precision problem is avoided.

In S406, a verification result is fed back to the client for determining a corresponding processing.

The server 4 feeds back the verification result of the game score of the user to the client 2, and the client 2 receives the verification result. When the verification is passed, processing such as giving a reward to the user can be performed. When the verification fails, processing such as giving a warning against cheating to the user can be performed.

It should be noted that according to some embodiments, the server 4 may only verify the game score, and the client 2 determines a corresponding processing according to the verification result; or the server 4 may verify the game score and determine a corresponding processing, and then feed back both the verification result and the processing to the client 2, so that the client 2 directly performs processing according to the processing.

In the method of verifying a game score according to the above embodiments, it is possible to obtain a real score of a user by reporting an operation sequence of the user to the server and playing back the operation sequence in the server for comparison with and verification of the game score reported by the client, instead of merely receiving the report from the client, so as to achieve the purpose of preventing the user from cheating. Especially for some important scores, whether users cheat can be effectively verified, and negative impacts caused by misjudgment are avoided to maintain a healthy environment of games. Additionally, the above embodiments can also solve the problem of inconsistent calculation results of floating-point numbers under a multi-CPU architecture, and reduce, by means of a dynamic protocol length, the size of bytes used for the user operation sequence during transmission, thereby avoiding the waste of traffic.

Figure 5:
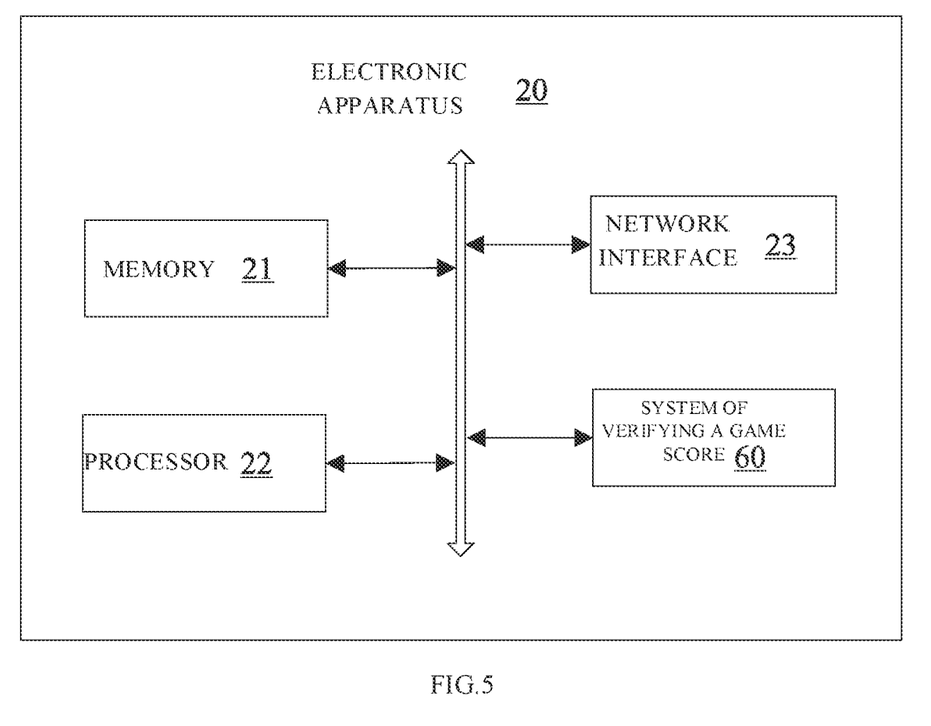
FIG. 5 is a schematic diagram of a hardware architecture of an electronic apparatus according to some embodiments of the present application.

FIG. 5 is a schematic diagram of a hardware architecture of an electronic apparatus 20 according to some embodiments of the present application. According to some embodiments, the electronic apparatus 20 may comprise, but is not limited to, a memory 21, a processor 22, and a network interface 23 that can be communicatively connected to each other via a system bus. It should be noted that FIG. 5 shows only the electronic apparatus 20 having components 21 to 23, but it should be understood that not all of the illustrated components are required to be implemented, and more or fewer components may be implemented instead. According to some embodiments, the electronic apparatus 20 may be the client 2 or the server 4.

The memory 21 comprises at least one type of readable storage medium, and the readable storage medium comprises a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 21 may be an internal storage unit of the electronic apparatus 20, such as a hard disk or a memory of the electronic apparatus 20. In some other embodiments, the memory 21 may also be an external storage device of the electronic apparatus 20, such as a plug-in hard disk disposed on the electronic apparatus 20, a smart media card (SMC), a secure digital (SD) card, and a flash card. Certainly, the memory 21 may also comprise both the internal storage unit of the electronic apparatus 20 and the external storage device thereof. According to some embodiments, the memory 21 is generally configured to store an operating system and various application software installed in the electronic apparatus 20, such as program codes of a system of verifying a game score 60 or 70. In addition, the memory 21 may be further configured to temporarily store various types of data that has been output or will be output.

The processor 22 may be, in some embodiments, a central processing unit (CPU), a controller, a microcontroller, a microprocessor, or other data processing chips. The processor 22 is generally configured to control the overall operation of the electronic apparatus 20. According to some embodiments, the processor 22 is configured to run program codes stored in the memory 21 or to process data, such as running the system of verifying a game score 60 or 70.

The network interface 23 may comprise a wireless network interface or a wired network interface, and the network interface 23 is generally configured to establish a communication connection between the electronic apparatus 20 and other electronic devices.

When a program stored in the memory 21 of the electronic apparatus 20 is executed by the processor 22, the method of verifying a game score described in the above-mentioned embodiments can be implemented.

Figure 6:
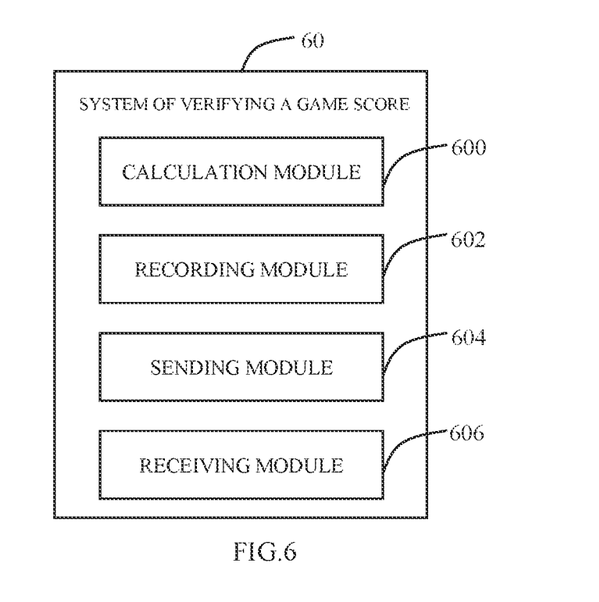
FIG. 6 is a schematic diagram of modules of a system of verifying a game score according to some embodiments of the present application.

FIG. 6 is a schematic diagram of modules of a system of verifying a game score 60 according to some embodiments of the present application. The system 60 may be divided into one or more program modules, and the one or more program modules are stored in a storage medium and executed by one or more processors to implement the embodiments of the present application. The program modules referred to in the embodiments of the present application refer to a series of computer program instruction segments that can complete a specific function. The functions of various program modules according to some embodiments will be specifically explained in the following description.

According to some embodiments, the system of verifying a game score 60 runs on the client 2, and the system 60 comprises:

a calculation module 600 configured to calculate a game score in real time according to an operation of a user.

In a game application, especially an action game, it is needed to calculate a game score in real time according to operations of a user. If the user obtains a good score in the game through his/her own operations, he/she can be on a ranking list or obtain a corresponding achievement reward. Because an immediate response is required to be made to the operations of the user in this type of games, a score calculation process is generally completed in the client 2, in which the game score of the user is calculated in real time according to the operations.

According to some embodiments, the score calculation result from the calculation module 600 needs to be reported to the server 4 after a game is over, so that the server 4 verifies whether cheating occurs to the score.

In order to ensure that the verification side and the client 2 at different platforms have consistent calculation results for the same floating-point computation, so as to avoid the precision problem, all floating-point computations are completed by means of indirect integer calculations according to some embodiments. This calculation is applicable to various platforms, and is used in computations with floating-point numbers, mainly including physical calculations, collision detection, health point modification calculations, etc.

Specifically, numeric types used in game calculations are uniformly represented by bytes with a preset number of bits (e.g., 64 bits), and bytes with a second half number of bits therein (e.g., 32 bits in a second half segment) are used to store data after the decimal point, while excessive precision is discarded (data beyond 32 bits after the decimal point is discarded).

The system of verifying a game score comprises a recording module 602 configured to record the operation and a corresponding operation time for generation of an operation sequence.

For each received operation of the user in the game, the recording module 602 records both the operation and the corresponding operation time. For example, in a fighting game, operations input by a user generally comprise operations on "up, down, left, and right" joysticks and four hitting buttons, and thus the above eight operations can be respectively recorded using eight values. In addition, it is also needed to record the time when each operation input by the user is received, and the time refers to a game time, i.e., the number of milliseconds taken from the start of the game to the current time upon receipt of the operation. According to a series of operations input by the user in the game and the operation time corresponding to each of the operations, an operation sequence can be generated.

The system of verifying a game score comprises a sending module 604 configured to report the recorded operation sequence and a score calculation result to a server after a game is over.

During the game, the calculation module 600 and the recording module 602 calculate the game score in real time and record the operation sequence of the user. After the game is over, the sending module 604 reports the operation sequence and the score calculation result to the server 4, so that the server 4 verifies whether cheating occurs to the score.

In a transmission protocol for reporting the operation sequence, first, at the beginning of the protocol, a first preset number of bytes (e.g., 4 bytes) are used to represent a first number of bits (N bits) occupied by the operation time (game time in the number of milliseconds) in the protocol, that is to say, the value of N is defined in the 4 bytes. Additionally, a second preset number of bytes (the next 4 bytes) are used to represent a second number of bits (M bits) occupied by the operation (the value corresponding to the user operation) in the protocol, that is to say, the value of M is defined in the 4 bytes. According to some embodiments, the first number of bits and/or the second number of bits, i.e., the values of N and/or M, may be determined according to one or more features specific to the game. For example, the features specific to the game comprise the number of optional operations (which may be used to determine the second number of bits, i.e., the value of M), the longest game duration (which may be used to determine the first number of bits, i.e., the value of N), etc. Because the values of N and M can be customized, the values of N and M can be reduced as much as possible according to different features specific to the game, so as to reduce the traffic during the reporting of a specific game using the protocol. Then, in the protocol, each of the operations and the corresponding operation time in the operation sequence are respectively represented by the bytes with the first number of bits (N bits) and the bytes with the second number of bits (M bits).

The system of verifying a game score comprises a receiving module 606 configured to receive a verification result of the game score from the server and perform corresponding processing.

The server 4 feeds back the verification result of the game score of the user to the client 2, and the receiving module 606 receives the verification result. When the verification is passed, processing such as giving a reward to the user can be performed. When the verification fails, processing such as giving a warning against cheating to the user can be performed.

It should be noted that according to some embodiments, the server 4 may only verify the game score, and the client 2 determines a corresponding processing according to the verification result; or the server 4 may verify the game score and determine a corresponding processing, and then feed back both the verification result and the processing to the client 2, so that the client 2 directly performs processing according to the processing.

In the system of verifying a game score provided according to the above embodiments, it is possible to obtain a real score of a user by reporting an operation sequence of the user to the server and playing back the operation sequence in the server for comparison with and verification of the game score reported by the client, instead of merely receiving the report from the client, so as to achieve the purpose of preventing the user from cheating. Especially for some important scores, whether users cheat can be effectively verified, and negative impacts caused by misjudgment are avoided to maintain a healthy environment of games. Additionally, the above embodiments can also solve the problem of inconsistent calculation results of floating-point numbers under a multi-CPU architecture, and reduce, by means of a dynamic protocol length, the size of bytes used for the user operation sequence during transmission, thereby avoiding the waste of traffic.

Figure 7:
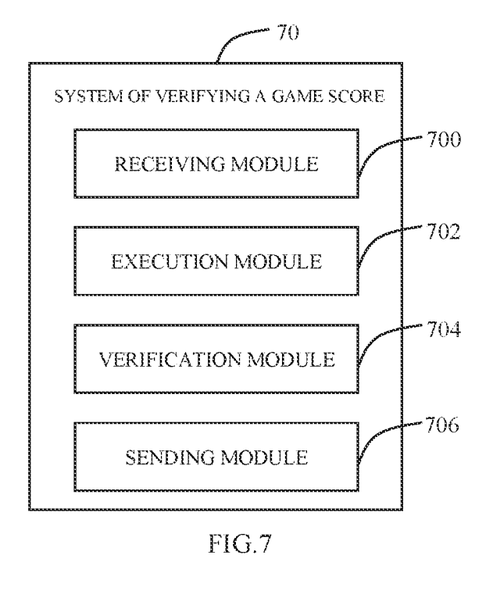
FIG. 7 is a schematic diagram of modules of a system of verifying a game score according to some embodiments of the present application.

FIG. 7 is a schematic diagram of modules of a system of verifying a game score 70 according to some embodiments of the present application. The system of verifying a game score 70 may be divided into one or more program modules, and the one or more program modules are stored in a storage medium and executed by one or more processors to implement the embodiments of the present application. The program modules referred to in the embodiments of the present application refer to a series of computer program instruction segments that can complete a specific function. The functions of various program modules according to some embodiments will be specifically explained in the following description.

According to some embodiments, the system of verifying a game score 70 runs on the server 4, and the system 70 comprises:

a receiving module 700 configured to receive a score calculation result and an operation sequence of a user reported by a client.

In a game application, especially an action game, it is needed to calculate a game score in real time according to operations of a user. If the user obtains a good score in the game through his/her own operations, he/she can be on a ranking list or obtain a corresponding achievement reward. Because an immediate response is required to be made to the operations of the user in this type of games, a score calculation process is generally completed in the client 2, in which the game score of the user is calculated in real time according to the operations.

According to some embodiments, the score calculation result in the client 2 needs to be reported to the server 4 after a game is over, so that the server 4 verifies whether cheating occurs to the score.

In order to ensure that the verification side and the client 2 at different platforms have consistent calculation results for the same floating-point computation, so as to avoid the precision problem, all floating-point computations are completed by means of indirect integer calculations according to some embodiments. This calculation is applicable to various platforms, and is used in computations with floating-point numbers, mainly including physical calculations, collision detection, health point modification calculations, etc.

Specifically, numeric types used in game calculations are uniformly represented by bytes with a preset number of bits (e.g., 64 bits), and bytes with a second half number of bits therein (e.g., 32 bits in a second half segment) are used to store data after the decimal point, while excessive precision is discarded (data beyond 32 bits after the decimal point is discarded).

Moreover, for each received operation of the user in the game, the client 2 records both the operation and the corresponding operation time. For example, in a fighting game, operations input by a user generally comprise operations on "up, down, left, and right" joysticks and four hitting buttons, and thus the above eight operations can be respectively recorded using eight values. In addition, it is also needed to record the time when each operation input by the user is received, and the time refers to a game time, i.e., the number of milliseconds taken from the start of the game to the current time upon receipt of the operation. According to a series of operations input by the user in the game and the operation time corresponding to each of the operations, an operation sequence can be generated.

During the game, the client 2 calculates the game score in real time and records the operation sequence of the user. After the game is over, the client 2 reports the operation sequence and the score calculation result to the server 4, so that the server 4 verifies whether cheating occurs to the score.

In a transmission protocol for reporting the operation sequence, first, at the beginning of the protocol, a first preset number of bytes (e.g., 4 bytes) are used to represent a first number of bits (N bits) occupied by the operation time (game time in the number of milliseconds) in the protocol, that is to say, the value of N is defined in the 4 bytes. Additionally, a second preset number of bytes (the next 4 bytes) are used to represent a number of bits (M bits) occupied by the operation (the value corresponding to the user operation) in the protocol, that is to say, the value of M is defined in the 4 bytes. According to some embodiments, the first number of bits and/or the second number of bits, i.e., the values of N and/or M, may be determined according to one or more features specific to the game. For example, the features specific to the game comprise the number of optional operations (which may be used to determine the second number of bits, i.e., the value of M), the longest game duration (which may be used to determine the first number of bits, i.e., the value of N), etc. Because the values of N and M can be customized, the values of N and M can be reduced as much as possible according to different features specific to the game, so as to reduce the traffic during the reporting of a specific game using the protocol. Then, in the protocol, each of the operations and the corresponding operation time in the operation sequence are respectively represented by the bytes with the first number of bits (N bits) and the bytes with the second number of bits (M bits).

The receiving module 700 receives, via the transmission protocol, the score calculation result and the operation sequence reported by the client 2, and then can restore the whole game process, so as to obtain the real score of the user and verify the game score.

The system of verifying a game score comprises an execution module 702 configured to start a game loop, and to perform operations of a user during the game loop according to the operation sequence, so as to obtain a real score of the user.

According to each operation and the corresponding operation time in the operation sequence, the execution module 702 plays back the operations of the user once again, i.e., performing each corresponding operation according to each operation time recorded in the operation sequence during the game loop, and then, the real score of the user can be calculated. In the process of performing operations of a user according to the operation sequence and calculating a real score, the execution module 702 also employs the above-mentioned integer calculation, i.e., using 64 bits to define numeric types used in the game calculations, and using 32 bits therein to store data after the decimal point.

The system of verifying a game score comprises a verification module 704 configured to compare the real score with the score calculation result reported by the client to verify whether cheating occurs to the score of the user.

If the score calculation result reported by the client 2 is consistent with the real score calculated by the execution module 702, it indicates that the user does not cheat and the game score verification is passed. If the score calculation result reported by the client 2 is inconsistent with the real score calculated by the execution module 702, it indicates that the user may cheat and the game score verification fails. Because the above-mentioned integer calculation is used in both the client 2 and the server 4, it can be ensured that calculation results for the same floating-point computation at both sides are consistent, and misjudgment of the verification result caused by the precision problem is avoided.

The system of verifying a game score comprises a sending module 706 configured to feed back a verification result to the client for determining a corresponding processing.

The sending module 706 feeds back the verification result of the game score of the user to the client 2, and the client 2 receives the verification result. When the verification is passed, processing such as giving a reward to the user can be performed. When the verification fails, processing such as giving a warning against cheating to the user can be performed.

It should be noted that according to some embodiments, the server 4 may only verify the game score, and the client 2 determines a corresponding processing according to the verification result; or the server 4 may verify the game score and determine a corresponding processing, and then feed back both the verification result and the processing to the client 2, so that the client 2 directly performs processing according to the processing.

In the system of verifying a game score according to the above embodiments, it is possible to obtain a real score of a user by playing back the operation sequence of the user in the server for comparison with and verification of the game score reported by the client, instead of merely receiving the report from the client, so as to achieve the purpose of preventing the user from cheating. Especially for some important scores, whether users cheat can be effectively verified, and negative impacts caused by misjudgment are avoided to maintain a healthy environment of games. Additionally, the above embodiments can also solve the problem of inconsistent calculation results of floating-point numbers under a multi-CPU architecture, and reduce, by means of a dynamic protocol length, the size of bytes used for the user operation sequence during transmission, thereby avoiding the waste of traffic.

The present application further provides another implementation, i.e., providing a non-transitory computer-readable storage medium storing a program of verifying a game score that, when executed by at least one processor, causes the at least one processor to execute the steps of the method of verifying a game score described above.

It should be noted that in this application, terms "include", "comprise" or any other variants thereof are intended to cover non-exclusive inclusion, so that a process, a method, an article or an apparatus that comprises a series of elements not only comprises those elements, but also comprises other elements that are not explicitly listed, or comprises inherent elements of the process, method, article, or apparatus. Without more restrictions, an element defined by the phrase "comprising a . . . " does not exclude the presence of additional identical elements in the process, method, article, or apparatus that includes the element.

The serial numbers of the embodiments of the present application described above are merely for description, and do not indicate that the embodiments are good or bad.

It will be apparent to a person skilled in the art that the various modules or steps of the present invention described in the embodiments of the present application can be implemented by a general-purpose computing device that can be centralized on a single computing device or distributed across a network formed by multiple computing devices. Optionally, they may be implemented by program codes executable by the computing device, such that they may be stored in a storage device and executed by the computing device, and in some cases, the steps shown or described may be performed in a sequence different from the sequence described herein, or they may be respectively fabricated into individual integrated circuit modules, or multiple modules or steps thereof may be implemented as a single integrated circuit module. In this way, the embodiments of the present application are not limited to any specific combination of hardware and software.

The foregoing descriptions are merely illustrative of preferred embodiments of the embodiments of the present application, and are not intended to limit the patent scope of the embodiments of the present application. Any equivalent structure or equivalent process transformation made using the contents of the specification and accompanying drawings of the embodiments of the present application, or any direct or indirect application thereof in other related technical fields shall equally fall within the patent protection scope of the embodiments of the present application.

What is claimed is:

1. A computer-implemented method applied by a client device, comprising:
    by a processor in the client device,
    calculating a game score in real time according to an operation of a user received by the client device;
    recording the operation received by the client device and an operation time corresponding to the operation;
    generating an operation sequence based on the recording, wherein the operation sequence comprises a plurality of operations received by the client device and a plurality of operation times each corresponding to a respective one of the plurality of operations received by the client device;
    reporting the operation sequence and a score calculation result to a server via a network interface after a game is over, wherein the reporting the operation sequence to the server comprises: using a transmission protocol with a dynamic length to report the operation sequence to the server, wherein the dynamic length of the transmission protocol is determined according to one or more features specific to the game, and wherein the one or more features specific to the game comprises a number of optional operations and the longest game duration;
    receiving a verification result of the game score from the server via the network interface; and
    performing a processing corresponding to the verification result of the game score received by the client device from the server via the network interface, wherein the server performs the operation of the user according to the operation sequence received from the client device to obtain a real score of the user, and compares the real score with the score calculation result to verify whether cheating occurs to the score calculation result.

2. The method of claim 1, wherein in the process of calculating a game score in real time and of the server performing the operation of the user received by the client device, integer calculation is employed, and wherein the integer calculation comprises:
using bytes with a preset number of bits to represent all numeric types used in game calculations, and using bytes with a second half number of bits to store data after a decimal point.

3. The method of claim 2, wherein the integer calculation comprises:
multiplying integer values or floating-point values by a preset multiple for conversion to integer data in a same format for subsequent game calculations, and obtaining original values by dividing by the preset multiple in a display stage.

4. The method of claim 1, wherein in the operation sequence, different operations received by the client device are respectively represented by corresponding values, and wherein the operation time is a number of milliseconds taken from the start of the game to the current game time upon receipt of the operation at the client device.

5. The method of claim 1, wherein in the transmission protocol for reporting the operation sequence, a first number of bits occupied by the operation time is defined by a first preset number of bytes at the beginning of the transmission protocol, a second number of bits occupied by the operation received by the client device is then defined by a second preset number of bytes, and wherein each of the plurality of operations received by the client device and the corresponding operation time in the operation sequence are respectively represented by the bytes with the first number of bits and the bytes with the second number of bits.

6. The method of claim 5, wherein the first number of bits and/or the second number of bits are determined according to one or more features specific to the game.

7. The method of claim 1, wherein the server performing the operation of the user comprises: starting a game loop, and performing the operation during the game loop according to the operation sequence to obtain a real score of the user by calculation.

8. An electronic apparatus, comprising:
one or more processors; and
a memory storing one or more programs configured to be executed by the one or more processors, the one or more programs comprising instructions for:
calculating a game score in real time according to an operation of a user received by the client device;
recording the operation received by the client device and an operation time corresponding to the operation;
generating an operation sequence based on the recording, wherein the operation sequence comprises a plurality of operations received by the client device and a plurality of operation times each corresponding to a respective one of the plurality of operations received by the client device;
reporting the operation sequence and a score calculation result to a server via a network interface after a game is over, wherein the reporting the operation sequence to the server comprises: using a transmission protocol with a dynamic length to report the operation sequence to the server, wherein the dynamic length of the transmission protocol is determined according to one or more features specific to the game, and wherein the one or more features specific to the game comprises a number of optional operations and the longest game duration;
receiving a verification result of the game score from the server via the network interface; and
performing a processing corresponding to the verification result of the game score received by the client device from the server via the network interface, wherein the server performs the operation of the user according to the operation sequence received from the client device to obtain a real score of the user, and compares the real score with the score calculation result to verify whether cheating occurs to the score calculation result.

9. The electronic apparatus of claim 8, wherein in the process of calculating a game score in real time and of the server performing the operation of the user received by the client device, integer calculation is employed, and wherein the integer calculation comprises:
using bytes with a preset number of bits to represent all numeric types used in game calculations, and using bytes with a second half number of bits to store data after a decimal point.

10. The electronic apparatus of claim 9, wherein the integer calculation comprises:
multiplying integer values or floating-point values by a preset multiple for conversion to integer data in a same format for subsequent game calculations, and obtaining original values by dividing by the preset multiple in a display stage.

11. The electronic apparatus of claim 8, wherein in the operation sequence, different operations received by the client device are respectively represented by corresponding values, and wherein the operation time is the number of milliseconds taken from a start of the game to the current game time upon receipt of the operation at the client device.

12. The electronic apparatus of claim 8, wherein in a transmission protocol for reporting the operation sequence, a first number of bits occupied by the operation time is defined by a first preset number of bytes at the beginning of the transmission protocol, a second number of bits occupied by the operation received by the client device is then defined by a second preset number of bytes, and wherein each of the operations received by the client device and the corresponding operation time in the operation sequence are respectively represented by the bytes with the first number of bits and the bytes with the second number of bits.

13. The electronic apparatus of claim 12, wherein the first number of bits and/or the second number of bits are determined according to one or more features specific to the game.

14. The electronic apparatus of claim 8, wherein the server performing the operation of the user comprises:
starting a game loop, and performing the operation during the game loop according to the operation sequence to obtain a real score of the user by calculation.

15. A non-transitory computer-readable storage medium, storing one or more programs comprising instructions that, when executed by one or more processors of a client device, cause the client device to perform operations comprising:
calculating a game score in real time according to an operation of a user received by the client device;
recording the operation received by the client device and an operation time corresponding to the operation;
generating an operation sequence based on the recording, wherein the operation sequence comprises a plurality of operations received by the client device and a plurality of operation times each corresponding to a respective one of the plurality of operations received by the client device;

reporting the operation sequence and a score calculation result to a server via a network interface after a game is over, wherein the reporting the operation sequence to the server comprises: using a transmission protocol with a dynamic length to report the operation sequence to the server, wherein the dynamic length of the transmission protocol is determined according to one or more features specific to the game, and wherein the one or more features specific to the game comprises a number of optional operations and the longest game duration;

receiving a verification result of the game score from the server via the network interface; and performing a processing corresponding to the verification result of the game score received by the client device from the server via the network interface, wherein the server performs the operation of the user according to the operation sequence received from the client device to obtain a real score of the user, and compares the real score with the score calculation result to verify whether cheating occurs to the score calculation result.

16. The non-transitory computer-readable storage medium of claim 15, wherein in the process of calculating a game score in real time and of the server performing the operation of the user received by the client device, integer calculation is employed, and wherein the integer calculation comprises:

using bytes with a preset number of bits to represent all numeric types used in game calculations, and using bytes with a second half number of bits to store data after a decimal point.

17. The non-transitory computer-readable storage medium of claim 16, wherein the integer calculation comprises:

multiplying integer values or floating-point values by a preset multiple for conversion to integer data in a same format for subsequent game calculations, and obtaining original values by dividing by the preset multiple in a display stage.

18. The non-transitory computer-readable storage medium of claim 15, wherein in the operation sequence, different operations received by the client device are respectively represented by corresponding values, and wherein the operation time is the number of milliseconds taken from the start of the game to a current game time upon receipt of the operation at the client device.

19. The non-transitory computer-readable storage medium of claim 15, wherein in a transmission protocol for reporting the operation sequence, a first number of bits occupied by the operation time is defined by a first preset number of bytes at the beginning of the transmission protocol, a second number of bits occupied by the operation received by the client device is then defined by a second preset number of bytes, and wherein each of the plurality of operations received by the client device and the corresponding operation time in the operation sequence are respectively represented by the bytes with the first number of bits and the bytes with the second number of bits.

20. The non-transitory computer-readable storage medium of claim 19, wherein the first number of bits and/or the second number of bits are determined according to one or more features specific to the game.

* * * * *